(12) United States Patent
Nguyen et al.

(10) Patent No.: US 9,077,570 B2
(45) Date of Patent: Jul. 7, 2015

(54) COMPACT DUAL ALL-OUTDOOR POINT-TO-POINT MICROWAVE RADIO ARCHITECTURE

(71) Applicant: ZTE (USA) Inc., Texas, TX (US)

(72) Inventors: Thanh Hung Nguyen, Cary, NC (US);
Ying Shen, Chapel Hill, NC (US);
Andrey Kochetkov, Cary, NC (US)

(73) Assignee: ZTE (USA) INC., Richardson, TX (US)

( * ) Notice: Subject to any disclaimer, the term of this patent is extended or adjusted under 35 U.S.C. 154(b) by 0 days.

(21) Appl. No.: 14/332,316

(22) Filed: Jul. 15, 2014

(65) Prior Publication Data

US 2015/0036728 A1    Feb. 5, 2015

Related U.S. Application Data (60) Provisional application No. 61/861,322, filed on Aug. 1, 2013.

(51) Int. Cl.
*H04B 1/38* (2006.01)
*H04B 7/06* (2006.01)
*H04B 7/08* (2006.01)
(Continued)

(52) U.S. Cl.
CPC ............ *H04L 25/0264* (2013.01); *H04L 1/06* (2013.01); *H04B 7/06* (2013.01); *H04B 1/40* (2013.01); *H04B 7/08* (2013.01)

(58) Field of Classification Search
CPC .............. H04B 1/38; H04B 1/40; H04B 7/04; H04B 7/06; H04B 7/08; H04L 1/06; H04L 1/0625; H04L 1/063; H04L 25/0264; H04L 25/026

USPC ......... 375/219, 220, 222, 299, 302, 308, 347; 455/73, 101, 553.1
See application file for complete search history.

(56) References Cited

U.S. PATENT DOCUMENTS 7,796,950 B2 *  9/2010  Cheng et al. ................. 455/63.1
8,126,095 B1    2/2012  Pare, Jr.
(Continued)

FOREIGN PATENT DOCUMENTS

WO    WO2013/013145 A2    1/2013

OTHER PUBLICATIONS

ZTE USA, Inc., Communication, Partial European Search Report, Rule 64 EPC—14178188.0, Jan. 5, 2015, 5 pgs.

*Primary Examiner* — Betsy Deppe
(74) *Attorney, Agent, or Firm* — Morgan, Lewis & Bockius LLP (57) ABSTRACT

An outdoor radio communication system housed in a single enclosure comprises a first transceiver, a second transceiver, a communication interface unit, an RF in-phase transmit combiner, an antenna coupling unit and a receive filter. The first transceiver includes a first receiver and a first transmitter. The second transceiver includes a second receiver and a second transmitter. The two transceivers are communicatively coupled with the communication interface unit. The RF in-phase transmit combiner, communicatively coupled to the first transmitter and the second transmitter, receives a phase-aligned RF signal from each transmitter, to create a third RF signal with enhanced signal gain. The two phase-aligned RF signals originate from the same source in the communication interface unit. The antenna coupling unit is communicatively coupled to the RF in-phase transmit combiner and the first receiver, and the receive filter is communicatively coupled to the second receiver.

10 Claims, 7 Drawing Sheets

(51) Int. Cl.
*H04L 25/02* (2006.01)
*H04L 1/06* (2006.01)
*H04B 1/40* (2015.01)

(56) References Cited

U.S. PATENT DOCUMENTS

2006/0030275 A1\* 2/2006 Buer et al. ................. 455/73
2008/0167069 A1\* 7/2008 Bridgelall ................ 455/553.1
2009/0252264 A1\* 10/2009 Reddy et al. ................. 375/345
2012/0082264 A1 4/2012 Shen
2012/0294299 A1\* 11/2012 Fernando ..................... 370/339

\* cited by examiner

FIG. 5

COMPACT DUAL ALL-OUTDOOR POINT-TO-POINT MICROWAVE RADIO ARCHITECTURE

RELATED APPLICATION

The present application claims priority to U.S. Provisional Application No. 61/861,322, "COMPACT DUAL ALL-OUTDOOR POINT-TO-POINT MICROWAVE RADIO ARCHITECTURE," filed on Aug. 1, 2013, which is hereby incorporated by reference in its entirety.

TECHNICAL FIELD

The present application relates to radio communication systems for point-to-point microwave communications and, more particularly, to a single enclosure containing at least two transceivers and corresponding communications circuitry.

BACKGROUND

Point-to-point digital microwave radios are playing a growing important role in the backhaul network of today's 4G and LTE wireless communications systems. To cope with the increasing throughput demands of these systems, several technical enhancements have been introduced in recent years to the design of microwave radios. These include the adoption of higher M-ary QAM (quadrature amplitude modulation) modulations beyond the traditional 256 QAM level to levels such as 1024/2048/4096 QAM. The spectral efficiency, and therefore, the channel capacity is incrementally increased with these new modulations. One other technique is the use of orthogonal polarizations on the same radio channel to double its capacity. However, along with these new enhancements are the challenges of reduced system gain, susceptibility to propagation fadings and interferences, especially co-channel interference in the dual polar systems. In addition to these performance-driven enhancements, modern microwave radios are also expected to operate at reduced power consumptions with a smaller form-factor. The inventions described herein address these requirements with a new dual compact all-outdoor radio with several technical and operational benefits.

SUMMARY

An object of the invention is to utilize the standby transmitter of a space diversity system along with the primary transmitter, for transmission of a communication signal with greater power. In this same system, the strength of the received signal power is also increased by utilizing the output of a first and second modem synchronously combined before being sent to a decoder.

In accordance with the present application involving a space diversity system, there is provided an RF combiner used to combine the two phase-aligned RF signals from the power amplifier of a first and a second transmitter. In this same system, the two transceivers and the corresponding communications circuitry are housed in a single, compact enclosure.

Another object of the present application is to improve the cross polar interference cancellation (XPIC) capability of a dual polar co-channel radio communication system. In conventional dual polar co-channel radio communication systems, a first radio unit encloses a first transceiver for processing a first (e.g. vertically) polarized RF signal, a first modem, a first physical layer aggregator (PLA) and a first Ethernet switch. In such systems, a second radio unit encloses a second transceiver for processing a second (e.g. horizontally) polarized RF signal, a second modem, a second PLA and a second Ethernet switch. The two radio units in these conventional systems are connected by a pair of XPIC cables suited for stringent performance and environmental requirements. In the present application, the two transceivers and the corresponding communications circuitry are housed in a single, compact enclosure to eliminate the need for long, expensive and lossy XPIC cables as well as redundant communication circuitry.

Another object of the present application is to eliminate long, expensive, and lossy Ethernet cables in a passthrough repeater radio communication system. In a typical passthrough repeater radio communication system, a first radio unit is connected to a first (e.g. eastward-facing) antenna, and a second radio unit is connected to a second (e.g. westward-facing) antenna. The two radio units are conventionally interconnected by two Ethernet cables suited for stringent performance and environmental requirements. In the present application, the two transceivers and the corresponding communications circuitry are housed in a single, compact enclosure to eliminate the need of expensive and lossy Ethernet cables as well as expensive Ethernet phyceivers.

BRIEF DESCRIPTION OF DRAWINGS

The accompanying drawings, which are included to provide a further understanding of the invention and are incorporated herein and constitute a part of the specification, illustrate embodiments of the invention and together with the description serve to explain the principles of the invention. Like reference numerals refer to corresponding parts throughout the several views of the drawings.

DETAILED DESCRIPTION

Reference will now be made in detail to embodiments, examples of which are illustrated in the accompanying drawings. In the following detailed description, numerous non-limiting specific details are set forth in order to assist in understanding the subject matter presented herein. It will be apparent, however, to one of ordinary skill in the art that various alternatives may be used without departing from the scope of the present application and the subject matter may be practiced without these specific details. For example, it will be apparent to one of ordinary skill in the art that the subject matter presented herein can be implemented on many types of radio communication systems.

Figure 1A:
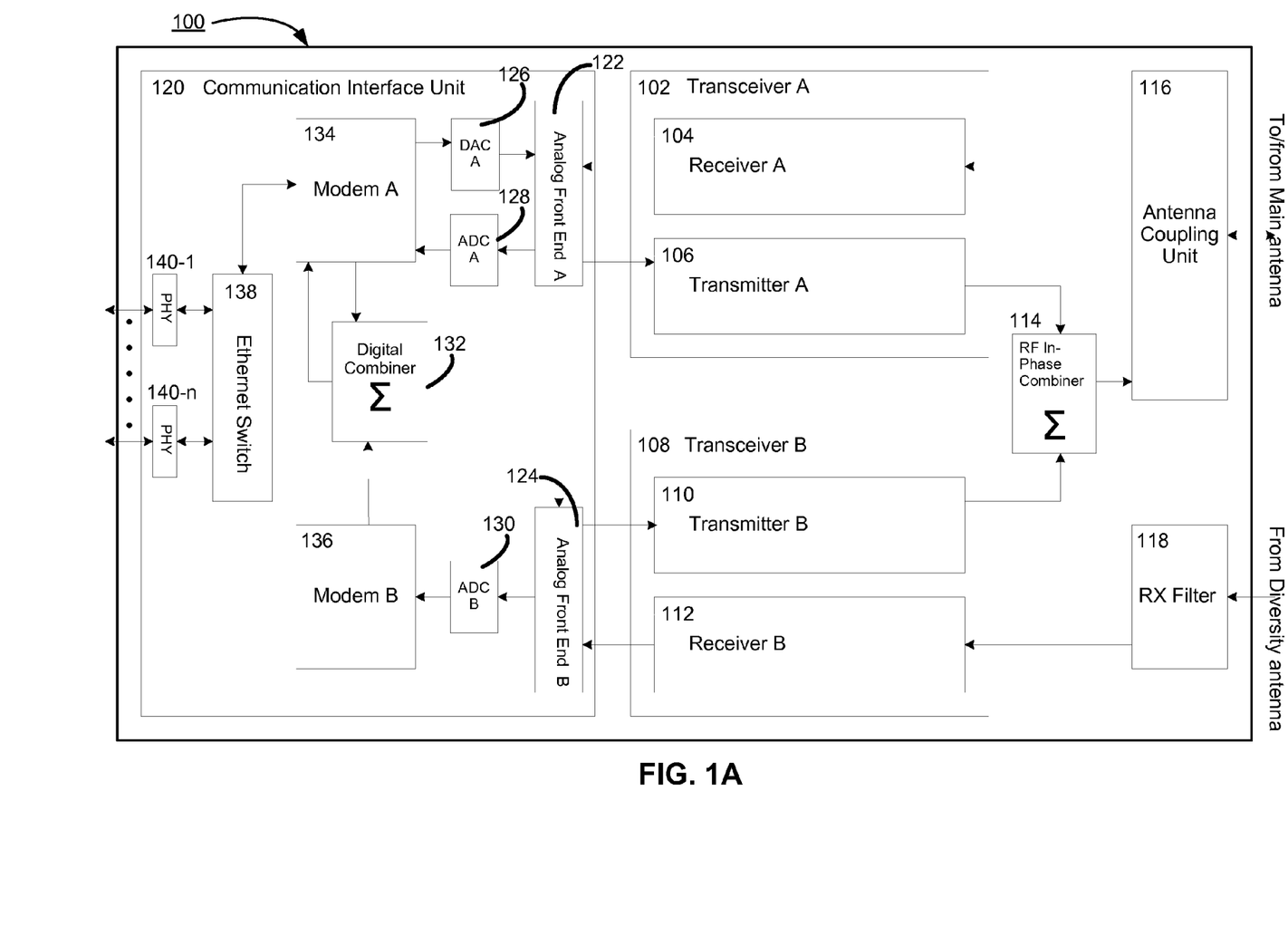
FIG. 1A is a schematic diagram of an exemplary space diversity radio communication system including two transceivers housed in a single enclosure.

FIG. 1A is a schematic diagram of an exemplary space diversity radio communication system 100 including two transceivers 102 and 108 housed in a single enclosure according to some embodiments of the present application.

In this example, during a reception-mode, a first antenna (not shown in FIG. 1A) receives a first radio frequency (RF) signal and sends it to Antenna Coupling Unit (ACU) 116. A second antenna (not shown in FIG. 1A), spaced apart from the first antenna, also receives the first RF signal and sends it to Rx (receive) Filter 118. The ACU 116 acts as a receive filter as well as a duplexer to isolate and filter the received first RF signal. The ACU sends a first filtered RF signal to Receiver A 104 of Transceiver A 102. Rx Filter 118 sends a second filtered RF signal to Receiver B 112 of Transceiver B 108. Receiver A 104 and Receiver B 112 perform the same function of converting the first filtered RF signal into a first intermediate frequency (IF) signal, and converting the second filtered RF signal into a second intermediate frequency (IF) signal, respectively.

The first IF signal is sent to Analog Front End A (AFE A) 122, and the second IF signal is sent to Analog Front End B (AFE B) 124. AFE A 122 passes the first IF signal to Analog-to-Digital Converter A (ADC A) 128, to convert the first IF signal into a first digital signal, and AFE B 124 passes the second IF signal to Analog-to-Digital Converter B (ADC B) 130, to convert the second IF signal into a second digital signal.

The first digital signal is demodulated by Modem A 134 into a first demodulated digital signal, and the second digital signal is demodulated by Modem B 136 into a second demodulated digital signal. A Digital Combiner 132 combines the first demodulated digital signal from Modem A 134 with the second demodulated digital signal from Modem B 136 to create a third combined digital signal. Digital Combiner 132 improves the signal-to-noise ratio (SNR) of the third combined digital signal, by performing phase alignment on the two demodulated digital signals before combining them. In some embodiments, Digital Combiner 132 selectively outputs either the third combined digital signal or the first demodulated digital signal from Modem A 134.

The output of the Digital Combiner 132 is received by a decoder inside Modem A 134 to decode the signal into a first decoded digital signal. The first decoded digital signal is received by Ethernet Switch 138, which distributes a plurality of Ethernet signal streams over a plurality of Ethernet Phyceivers 140-1 to 140-n.

It should be noted that in some embodiments, at least Transceiver A 102, Transceiver B 108, Communication Interface Unit 120, ACU 116, RF In-phase Combiner 114 and RX Filter 118 are housed in a single, compact enclosure to facilitate efficient and reliable transfer of communication signals within the space diversity radio communication system 100.

FIG. 1A can also be used to describe the transmission-mode of this exemplary space diversity radio communication system 100. A first digital signal is received at Ethernet Switch 138. The first digital signal is sent to Modem A 134 to be modulated into a first modulated digital signal. The first modulated digital signal is sent to Digital-to-Analog Converter A (DAC A) 126, where it is converted into a first modulated analog signal. The first modulated analog signal is received at AFE A 122 that generates a second modulated analog signal to send to AFE B 124, where the second modulated analog signal has the same frequency as the first modulated analog signal. In some embodiments, Modem A 134 contains an IQ (in-phase/quadrature) demodulator, to split the first digital signal into I and Q component signals, and therefore propagate I and Q component signals to DAC A 126 to create a demodulated analog I and Q signal pair that gets sent to AFE A 122.

The first modulated analog signal is received at Transmitter A 106 of Transceiver A 102, and the second modulated analog signal is received in Transmitter B 110 of Transceiver B 108. A first amplified analog signal is generated from the first modulated analog signal at Transmitter A 106, and a second amplified analog signal from the second modulated analog signal is generated at Transmitter B 110. Transmitter A 106 and Transmitter B 110 ensure that the first amplified analog signal and second amplified analog signal are phase-aligned with respect to each other.

The first amplified analog signal from Transmitter A 106 is combined with the second amplified analog signal from Transmitter B 110 at RF in-phase Combiner 114 to create a third amplified analog signal. The third amplified analog signal is received at the ACU 116 to transmit the amplified analog signal to a first antenna (not shown in FIG. 1A).

Figure 1B:
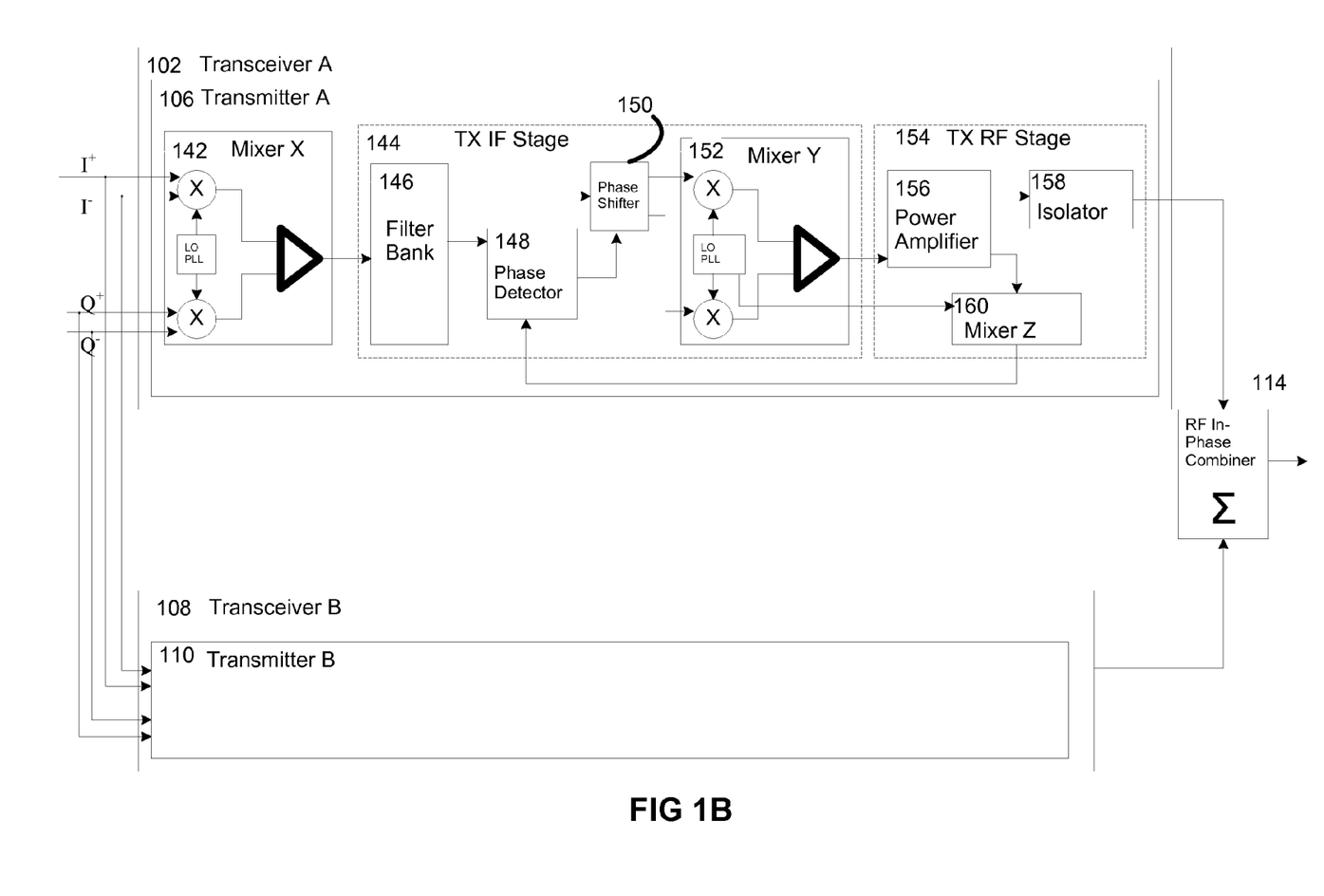
FIG. 1B is a schematic diagram of an exemplary transmitter in a space diversity radio communication system showing how in-phase signals are sent to an RF in-phase combiner.

FIG. 1B is a schematic diagram of an exemplary transmitter employing phase alignment in system 100. It should be noted that Transmitter A 106 and Transmitter B 110 are substantially similar in composition and operation, therefore only Transmitter A will be referred to. Transmitter A 106 comprises Mixer X 142, TX IF Stage 144 and TX RF Stage 154. In this example, Mixer X 142 receives analog I and Q signal pairs from Analog Front End A 122 (not shown in FIG. 1B), and combines them into a first combined intermediate frequency (IF) signal. The first combined IF signal is sent to Filter Bank 146 of TX IF Stage 144, to create a first filtered IF signal and a second filtered IF signal. Phase detector 148 receives the first filtered IF signal and a sample output RF signal of the Power Amplifier 156, down-converted in Mixer Z 160 using the same RF local oscillator (LO) used in Mixer Y 152. The second filtered IF signal from Filter Bank 146 is sent to Phase Shifter 150. The output of the Phase Detector 148 is also sent to Phase Shifter 150 which adjusts the phase of the second filtered IF signal received from Filter Bank 146, to output two phase-adjusted IF signals to Mixer Y 152. Mixer Y 152 combines the two phase-adjusted IF signals to generate a first combined radio frequency (RF) signal. This first combined RF signal is sent to Power Amplifier 156 to create an amplified first output RF signal to send to Isolator 158 for eventual transmission, and an amplified sample output RF signal to send to Mixer Z 160 for phase alignment. Isolator 158 sends the amplified first output RF signal to RF In-Phase Combiner 114. In some embodiments, Phase Shifter 150 includes a quadrature hybrid block to generate two IF signals with a 90-degree phase offset between them, to output from the Phase Shifter 150 block.

Figure 1C:
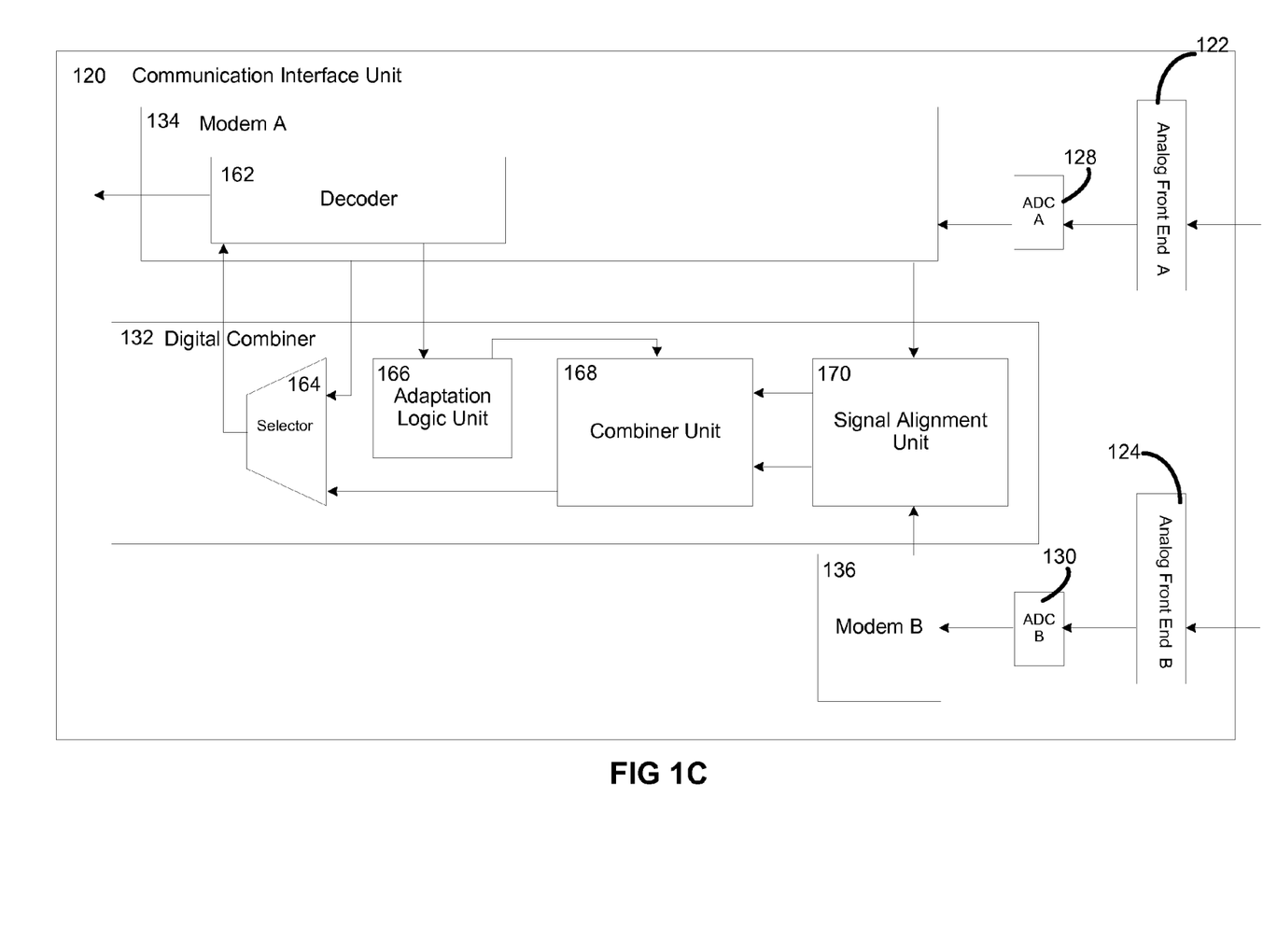
FIG. 1C is a schematic diagram of an exemplary digital combiner in a space diversity radio communication system showing how digital signals are combined, phase aligned and selected in the exemplary digital combiner.

FIG. 1C is a schematic diagram of an exemplary digital combiner 132 in Communication Interface Unit 120 employing signal alignment to combine received spatially diverse signals in system 100. As explained above, ADC A 128 converts the first IF signal received from AFE A 122 into a first digital signal, and ADC B 130 converts the second IF signal received from AFE B 124 into a second digital signal.

The first digital signal is demodulated by Modem A 134 into a first demodulated digital signal, sent to Signal Alignment Unit 170 and the second digital signal is demodulated by Modem B 136 into a second demodulated digital signal sent to Signal Alignment Unit 170. Signal Alignment Unit 170 outputs two phase-aligned digital signals to Combiner Unit 168 which uses Adaptation Logic Unit 166 to adjust the output of Combiner Unit 168 before it sends a combined, phase-aligned digital signal to Selector 164. Adaptation Logic Unit 166 uses feedback from Decoder 162 in Modem A 134 to adjust the output of Combiner Unit 168. Selector 164 receives two inputs, namely the first demodulated digital signal generated by Modem A 134, and the combined, phase-aligned digital signal from Combiner Unit 168. Selector 164 is used as a switch to select whether to use the combined, phase-aligned digital signal with increased signal strength if the radio communication system 100 is being operated in diversity mode, or to simply use the first demodulated digital signal from Modem A 134, if the system 100 is not operating in diversity mode. The Selector 164 outputs a first selected digital signal that is sent to Decoder 162 in Modem A 134, to decode the signal into a first decoded digital signal.

Figure 2:
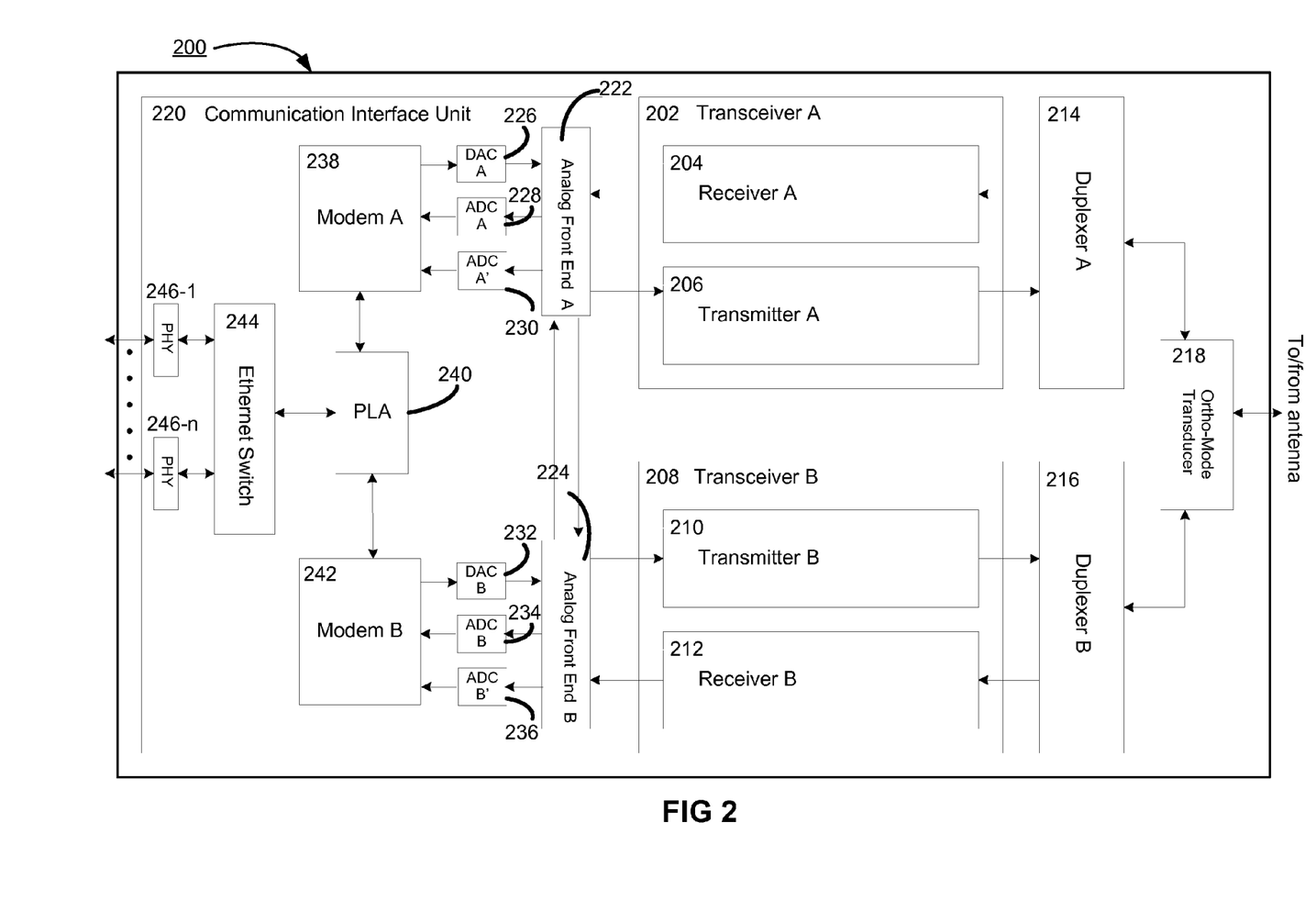
FIG. 2 is a schematic diagram of an exemplary dual polar co-channel radio communication system including two transceivers housed in a single enclosure.

FIG. 2 is a schematic diagram of an exemplary dual polar co-channel configuration radio communication system 200, including two transceivers 202 and 208 housed in a single enclosure according to some embodiments of the present application. Transceiver A 202 further includes a Receiver A 204 and a Transmitter A 206, and Transceiver B 208 further includes a Transmitter B 210 and a Receiver B 212.

In this example, an antenna (not shown in FIG. 2) receives a radio frequency (RF) signal with a vertically polarized component and a horizontally polarized component. The RF signal is sent to an Orthomode Transducer (OMT) 218, which splits the RF signal into two components, a vertically polarized RF signal for processing by Duplexer A 214, and a horizontally polarized RF signal for processing by Duplexer B. In some embodiments, the OMT 218 can be replaced with a polarization duplexer.

It should be noted that in this exemplary dual polar co-channel configuration radio communication system 200, analogous components such as Duplexer A 214 and Duplexer B 216, or Modem A 238 and Modem B 242 operate in substantially the same manner, except for the difference in the polarization of the signals passing through these components. For illustrative purposes, the following description primarily focuses on the path in system 200 processing vertically polarized signals. It will be apparent for one skilled in the art to understand how the other signal path operates based on the description therein.

The vertically polarized RF signal output by the OMT 218 is received by Duplexer A 214. Duplexer A 214 isolates the received vertically polarized RF signal before sending the vertically polarized RF signal to Receiver A 204 of Transceiver A 202. Receiver A 204 down-converts the vertically polarized RF signal into an intermediate frequency signal (vertical IF signal). The vertical IF signal is then sent to Analog Front End A (AFE A) 222 of the Communication Interface Unit 220. AFE A 222 takes the vertical IF signal, and splits it into two identical signals for cross polar interference cancelling (XPIC). One of the vertical IF signals is sent to Analog-to-Digital Converter A (ADC A) 228, and the other is sent to Analog Front End B (AFE B) 224 which sends the vertical IF signal to Analog-to-Digital Converter B' (ADC B') 236. In some embodiments, AFE A 222 sends a vertical IF signal to AFE B 224 through embedded traces in a common printed circuit board housing AFE A 222 and AFE B 224.

The parallel communication path comprising Duplexer B 216 and Transceiver B 208 processes a horizontally polarized RF signal output by the OMT 218, resulting in an intermediate frequency signal (horizontal IF signal) sent from Receiver B 212 to AFE B 224. The horizontal IF signal is similarly split into two identical signals for cross polar interference cancelling (XPIC). One of the horizontal IF signals is sent to Analog-to-Digital Converter B (ADC B) 234, and the other is sent to Analog Front End A' (AFE A') 222 which sends the horizontal IF signal to Analog-to-Digital Converter A' (ADC A') 230.

The vertical IF signal received by ADC A 228 is converted into a first vertical digital signal and sent to Modem A 238. The horizontal IF signal received by ADC A' 230 is converted into a first horizontal digital signal and sent to Modem A 238. Modem A 238 uses the first horizontal digital signal as a reference signal for cross polar interference cancellation (XPIC) in the first vertical digital signal. Modem B 242 performs a similar function for cross polar interference cancellation (XPIC) in a second horizontal digital signal received from ADC B 234, using a second vertical digital signal as a reference signal. Modem A 238 outputs a demodulated post-XPIC vertical digital signal to a Physical Layer Aggregator (PLA) block 240. Modem B 242 also outputs a demodulated post-XPIC horizontal digital signal to PLA block 240. Inside PLA block 240, the demodulated post-XPIC vertical digital signal and the demodulated post-XPIC horizontal digital signal are combined to form a consolidated digital signal. The PLA block sends this consolidated digital signal to Ethernet Switch 244, which distributes a plurality of Ethernet signal streams over a plurality of Ethernet Phyceivers 246-1 to 246-n.

Note that some or all of the components in the Communication Interface Unit 220 may be in the form of individual components as shown in FIG. 2 or integrated into one or more components. For example, AFE A 222 and AFE B 224 may take the form of one unit, e.g. an analog front end printed circuit board with built-in XPIC capability.

In addition, FIG. 2 depicts that Communication Interface Unit 220, Transceiver A 202, Transceiver B 208, Duplexer A 214, Duplexer B 216 and OMT 218 are housed in a single enclosure to create an enclosed exemplary dual polar co-channel configuration radio communication system 200.

Figure 3:
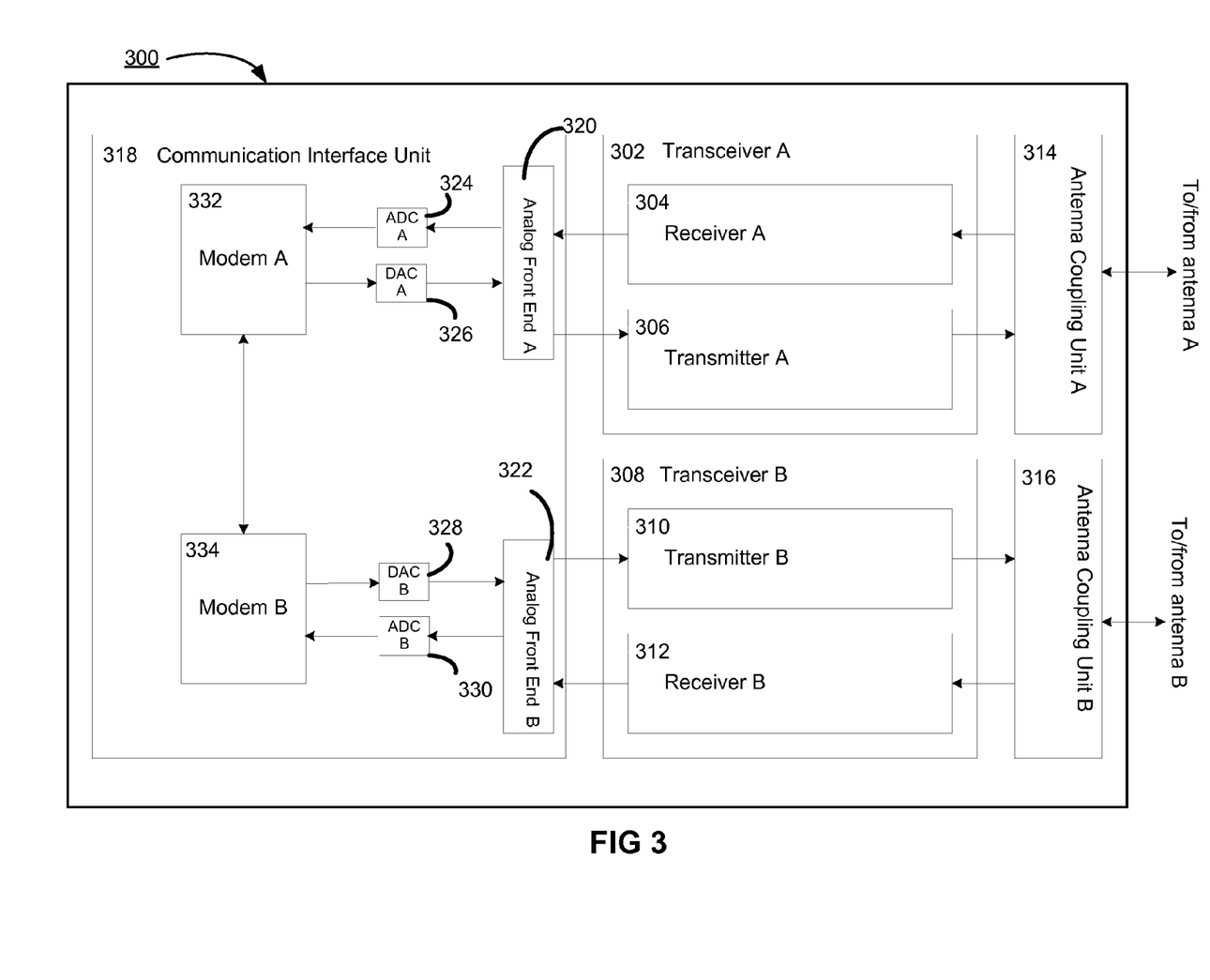
FIG. 3 is a schematic diagram of an exemplary passthrough repeater radio communication system including two transceivers housed in a single enclosure.

FIG. 3 is a schematic diagram of an exemplary passthrough repeater radio communication system 300 including two transceivers 302 and 308 housed in a single enclosure according to some embodiments of the present application. Transceiver A 302 further includes a Receiver A 304 and a Transmitter A 306, and Transceiver B 308 further includes a Transmitter B 310 and a Receiver B 312.

It should be noted that in this exemplary passthrough repeater radio communication system 300, analogous components such as Antenna Coupling Unit A (ACU A) 314 and Antenna Coupling Unit B (ACU B) 316 operate in substantially the same manner, depending on whether antenna A (not shown in the figure) is receiving and Antenna B (not shown in the figure) is transmitting, or if Antenna A is transmitting and Antenna B is receiving. For illustrative purposes, the following description primarily focuses on the mode where Antenna A is receiving an RF signal, and Antenna B is transmitting an RF signal. But it will be apparent for one skilled in the art to understand the operation of the mode where Antenna A is transmitting and Antenna B is receiving, based on the description therein.

In this example, ACU A 314 of the passthrough repeater radio communication system 300 receives a radio frequency (RF) signal from antenna A. ACU A 314 and ACU B 316 perform duplexing functions and act as receive filters for incoming signals from antenna A and antenna B respectively. In some embodiments, ACU A 314 utilizes a bandpass filter to filter the incoming RF signal. ACU A 314 provides a coupling system between antenna A and receiver A 304 of transceiver A 302. This coupling system also provides impedance matching to minimize transmission line losses in signal strength of the incoming RF signal from antenna A.

After ACU A 314 has filtered the incoming RF signal from antenna A, it sends the filtered RF signal to Receiver A 304 of Transceiver A 302. In Receiver A 304, the filtered incoming RF signal is converted into an intermediate frequency signal. In some embodiments, Receiver A 304 generates the intermediate frequency signal by mixing the filtered incoming RF signal with an output signal from a local oscillator in Receiver A 304.

The intermediate frequency signal output from Receiver A 304 is provided to Analog Front End A (AFE A) 320 in Communication Interface Unit 318. AFE A 320 processes the intermediate frequency signal received from Receiver A 304 and provides it to Analog-to-Digital Converter A (ADC A) 324. ADC A 324 converts the processed intermediate frequency signal into a digital signal. The digital signal is provided to Modem A 332. Modem A 332 demodulates the digital signal, and sends the demodulated signal to Modem B 334 to start the transmission portion of the passthrough repeater process. In this exemplary passthrough repeater radio communication system 300, long, expensive and lossy Ethernet cables are unnecessary for Modem A 332 and Modem B 334 to communicate as they are contained within the single enclosure housing radio communication system 300. In some embodiments, Modem A 332 and Modem B 334 are communicatively coupled by electrical traces on a common printed circuit board.

The demodulated signal received at Modem B 334 is remodulated into a modulated digital signal. Combining Communication Interface Unit 318, Transceiver A 302, Transceiver B 308, ACU A 314 and ACU B 316 in a single enclosure provides the additional benefit of reducing the circuitry required to amplify and filter the demodulated signal received at Modem B 334. Nonetheless, in some embodiments, Modem B 334 performs filtering and amplification operations to improve the quality of remodulation. In some embodiments Modem B 334 modulates the incoming demodulated signal using a modulation method such as QAM (quadrature amplitude modulation) to produce an in-phase signal (I) and a quadrature-phase signal (Q).

This modulated digital signal or signal pair is sent to Digital-to-Analog converter B (DAC B) 328. DAC B 328 converts the modulated digital signal into an analog signal to be sent to Analog Front End B (AFE B) 322. The AFE B 322 block processes the analog signal before sending the processed analog signal to Transmitter B 310 of Transceiver B 308. In some embodiments, Communication Interface Unit 318 further includes Digital-to-Analog converter A (DAC A) 326 coupled between Modem A 332 and Analog Front End A 320. In some embodiments, Communication Interface Unit 318 further includes Analog-to-Digital converter B (ADC B) 330 coupled between Analog Front End B 322 and Modem B 334.

In Transmitter B 310, the processed analog signal is converted into a high frequency RF signal. The high frequency RF signal is provided to Antenna Coupling Unit B (ACU B) 316. ACU B 316 processes the high frequency RF signal before sending it to Antenna B (not shown in FIG. 3) for transmission to another radio communication system (not shown in FIG. 3). As discussed earlier, performance of this passthrough repeater radio communication system 300 is substantially the same if Antenna B is receiving an RF signal and Antenna A is transmitting the demodulated and remodulated version of the RF signal received at Antenna B.

Figure 4:
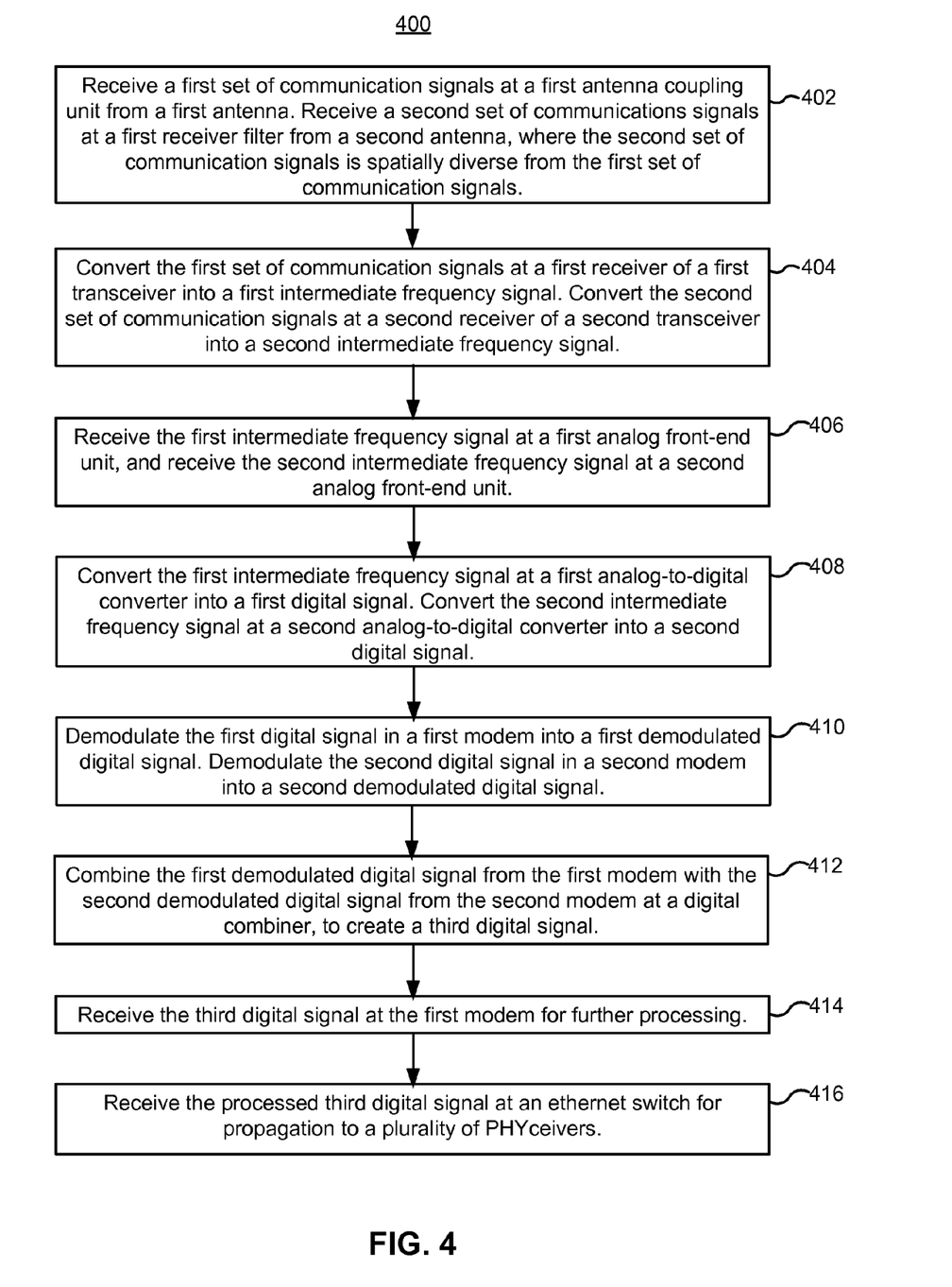
FIG. 4 is a flow diagram illustrating a method for receiving communication signals in a space diversity system contained in a single enclosure.

FIG. 4 is a flow diagram illustrating a method 400 for receiving communication signals in a space diversity system contained in a single enclosure. The system receives (402) a first set of communication signals at a first antenna coupling unit from a first antenna, and receives a second set of communications signals at a first receive filter from a second antenna, where the second set of communication signals is spatially diverse from the first set of communication signals. The system converts (404) the first set of communication signals at a first receiver of a first transceiver into a first intermediate frequency signal, and converts the second set of communication signals at a second receiver of a second transceiver into a second intermediate frequency signal.

The system receives (406) the first intermediate frequency signal at a first analog front-end unit, and receives the second intermediate frequency signal at a second analog front-end unit. The system converts (408) the first intermediate frequency signal at a first analog-to-digital converter into a first digital signal, and converts the second intermediate frequency signal at a second analog-to-digital converter into a second digital signal. The system demodulates (410) the first digital signal in a first modem into a first demodulated digital signal, and demodulates the second digital signal in a second modem into a second demodulated digital signal. The system combines (412) the first demodulated digital signal from the first modem with the second demodulated digital signal from the second modem at a digital combiner, to create a third digital signal. The system receives (414) the third digital signal at the first modem for further processing, and receives (416) the processed third digital signal at an Ethernet switch for propagation to a plurality of PHYceivers.

Figure 5:
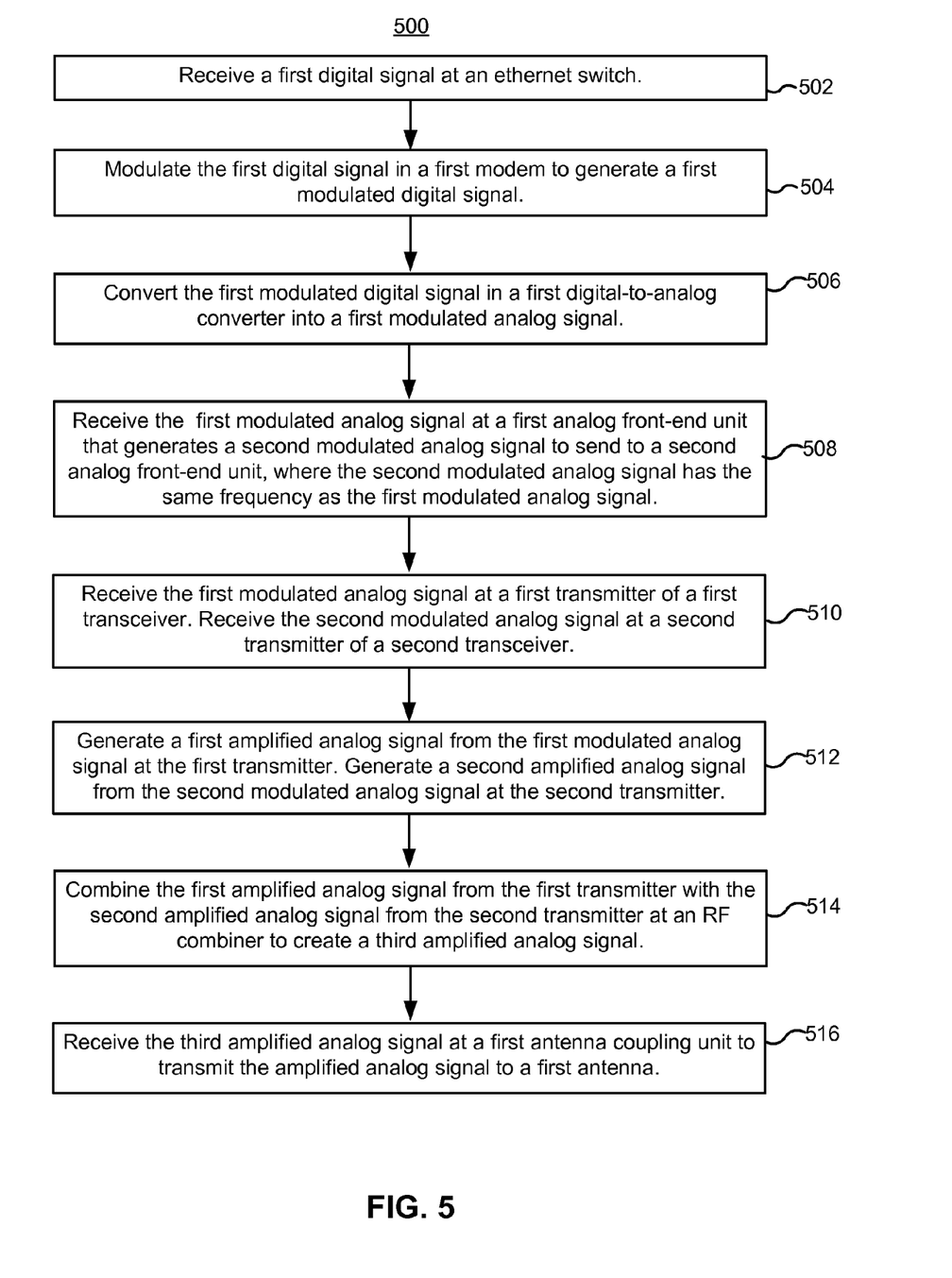
FIG. 5 is a flow diagram illustrating a method for transmitting communication signals in a space diversity system contained in a single enclosure.

FIG. 5 is a flow diagram illustrating a method 500 for transmitting communication signals in a space diversity system contained in a single enclosure. The system receives (502) a first digital signal at an Ethernet switch, and modulates (504) the first digital signal in a first modem to generate a first modulated digital signal. The system converts (506) the first modulated digital signal in a first digital-to-analog converter into a first modulated analog signal. The system receives (508) the first modulated analog signal at a first analog front-end unit that generates a second modulated analog signal to send to a second analog front-end unit, wherein the second modulated analog signal has the same frequency as the first modulated analog signal. The system receives (510) the first modulated analog signal at a first transmitter of a first transceiver, and receives the second modulated analog signal at a second transmitter of a second transceiver. The system generates (512) a first amplified analog signal from the first modulated analog signal at the first transmitter, and generates a second amplified analog signal from the second modulated analog signal at the second transmitter. The system combines (514) the first amplified analog signal from the first transmitter with the second amplified analog signal from the second transmitter at an RF combiner to create a third amplified analog signal. The system receives (516) the third amplified analog signal at a first antenna coupling unit to transmit the amplified analog signal to a first antenna.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific examples of the embodiments disclosed and that modifications and other embodiments are intended to be included within the scope of the appended claims. Although specific terms are employed herein, they are used in a generic and descriptive sense only and not for purposes of limitation.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. An outdoor radio communication system housed in a single enclosure, comprising:
    a first transceiver, wherein the first transceiver includes a first receiver and a first transmitter;
    a second transceiver, wherein the second transceiver includes a second receiver and a second transmitter;
    a communication interface unit communicatively coupled to the first transceiver and the second transceiver, wherein the communication interface unit further includes:
        a first analog front-end block communicatively coupled to the first transceiver;
        a second analog front-end block communicatively coupled to the second transceiver;
        a first modem communicatively coupled to the first analog front-end block;
        a second modem communicatively coupled to the second analog front-end block;
        an Ethernet switch communicatively coupled to the first modem; and
        a digital combiner block communicatively coupled to the first modem and the second modem, wherein the digital combiner block is configured to output either:
            a combined digital signal with enhanced signal-to-noise ratio generated by combining a digital signal from the first modem and a digital signal from the second modem, or
            a single digital signal from the first modem back to the first modem;
    an RF in-phase transmit combiner communicatively coupled to the first transmitter and the second transmitter, wherein the RF in-phase transmit combiner receives a phase-aligned RF signal from each respective transmitter, such that the two phase-aligned RF signals originate from the same source in the communication interface unit, and the RF in-phase transmit combiner creates a third, gain-enhanced RF signal from the combination of the two phase-aligned RF signals;
    an antenna coupling unit communicatively coupled to the RF in-phase transmit combiner and the first receiver of the first transceiver; and
    a receive filter communicatively coupled to the second receiver.

2. The radio communication system of claim 1, further comprising:
    a first digital-to-analog converter communicatively coupled to the first modem and the first analog front-end block;
    a first analog-to-digital converter communicatively coupled to the first modem and the first analog front-end block; and
    a second analog-to-digital converter communicatively coupled to the second modem and the second analog front-end block.

3. The radio communication system of claim 1, wherein the first transmitter and the second transmitter each comprise:
    a first mixer for combining I and Q component signals into a first combined intermediate frequency signal;
    a filter bank communicatively coupled to the first mixer to create a first filtered intermediate frequency signal and a second filtered intermediate frequency signal;
    a phase detector to detect a difference in phase alignment of the second filtered intermediate frequency signal and a sample output RF signal;
    a phase shifter communicatively coupled to the filter bank and the phase detector, to shift the phase of the first filtered intermediate frequency signal, using feedback from the phase detector;
    a second mixer communicatively coupled to the phase shifter to generate a first radio frequency signal;
    a power amplifier communicatively coupled to the second mixer to generate an amplified first output RF signal and a sample output RF signal; and
    an isolator communicatively coupled to the power amplifier and the RF in-phase transmit combiner.

4. The radio communication system of claim 1, further comprising:
    a plurality of PHYceivers communicatively coupled to the Ethernet switch.

5. The radio communication system of claim 1, wherein the digital combiner block includes:
    a signal alignment unit used to align a first digital signal from the first modem and a second digital signal from the second modem;
    a combiner unit for combining the two aligned signals output from the signal alignment unit;
    an adaptation logic unit communicatively coupled to a first decoder inside the first modem and the combiner unit to adjust the two aligned signals output from the signal alignment unit before being combined inside the combiner unit; and
    a selector block to selectively output either the first digital signal of the first modem, or the output signal of the combiner unit, depending on whether or not the radio communication system is operating in space diversity mode.

6. An outdoor radio communication system housed in a single enclosure, comprising:
    a first transceiver, wherein the first transceiver includes a first receiver and a first transmitter;
    a second transceiver, wherein the second transceiver includes a second receiver and a second transmitter;
    a first antenna coupling unit, wherein the first antenna coupling unit is communicatively coupled to the first transceiver;
    a second antenna coupling unit, wherein the second antenna coupling unit is communicatively coupled to the second transceiver; and
    a communication interface unit, wherein the communication interface unit further includes:
        a first analog front-end block communicatively coupled to the first transceiver;
        a second analog front-end block communicatively coupled to the second transceiver;
        a first modem communicatively coupled to the first analog front-end block; and
        a second modem communicatively coupled to the second analog front-end block and communicatively coupled to the first modem by built-in interconnection pathways;
        an Ethernet switch communicatively coupled to the first modem; and
        a digital combiner block communicatively coupled to the first modem and the second modem, wherein the digital combiner block is configured to output either:

a combined digital signal with enhanced signal-to-noise ratio generated by combining a digital signal from the first modem and a digital signal from the second modem, or a single digital signal from the first modem back to the first modem.

7. The radio communication system of claim 6, further comprising:
   a first digital-to-analog converter communicatively coupled to the first modem and the first analog front-end block;
   a first analog-to-digital converter communicatively coupled to the first modem and the first analog front-end block;
   a second digital-to-analog converter communicatively coupled to the second modem and the second analog front-end block; and
   a second analog-to-digital converter communicatively coupled to the second modem and the second analog front-end block.

8. A method for transmitting communication signals in a space diversity system contained in a single enclosure, comprising:
   receiving a first digital signal at an Ethernet switch;
   modulating the first digital signal in a first modem to generate a first modulated digital signal;
   converting the first modulated digital signal in a first digital-to-analog converter into a first modulated analog signal;
   receiving the first modulated analog signal at a first analog front-end unit that generates a second modulated analog signal to send to a second analog front-end unit, wherein the second modulated analog signal has the same frequency as the first modulated analog signal;
   receiving the first modulated analog signal at a first transmitter of a first transceiver, and receiving the second modulated analog signal in a second transmitter of a second transceiver;
   generating a first amplified analog signal from the first modulated analog signal at the first transmitter, and generating a second amplified analog signal from the second modulated analog signal at the second transmitter;
   combining the first amplified analog signal from the first transmitter with the second amplified analog signal from the second transmitter at an RF combiner to create a third amplified analog signal; and
   receiving the third amplified analog signal at a first antenna coupling unit to transmit the amplified analog signal to a first antenna.

9. The method of claim 8, wherein the first amplified analog signal from the first transmitter and the second amplified analog signal from the second transmitter are phase-aligned with each other before being combined into the third amplified analog signal at the RF combiner.

10. The method of claim 8, wherein generating a first amplified analog signal and generating a second amplified analog signal includes phase detection and phase shifting in the first transmitter and the second transmitter, respectively, to generate the first amplified analog signal in-phase with the second amplified analog signal.

* * * * *